United States Patent [19]

Pazzaglia

[11] Patent Number: 5,277,532
[45] Date of Patent: Jan. 11, 1994

[54] MECHANICAL ACCELERATION DEVICE IN CAN WELDING MACHINES

[75] Inventor: Luigi Pazzaglia, Bologna, Italy

[73] Assignee: Cefin S.p.A., Bologna, Italy

[21] Appl. No.: 982,128

[22] Filed: Nov. 25, 1992

Related U.S. Application Data

[63] Continuation of Ser. No. 547,037, Jul. 2, 1990, abandoned.

[30] Foreign Application Priority Data

Jul. 31, 1989 [IT] Italy .................. 3574 A/89

[51] Int. Cl.⁵ .................. B21D 51/10; B65G 47/82
[52] U.S. Cl. .................. 413/72; 198/468.11
[58] Field of Search .................. 413/70–76; 198/468.11, 468.1; 219/64

[56] References Cited

U.S. PATENT DOCUMENTS

| | | | |
|---|---|---|---|
| 1,628,928 | 5/1927 | Taylor | 219/64 |
| 2,711,245 | 6/1955 | Taylor | 198/468.11 |
| 2,964,006 | 12/1960 | Johnson | 413/74 |
| 4,194,614 | 3/1980 | Hrivnak | 198/468.1 |
| 4,202,483 | 5/1980 | Sillars | 413/74 |
| 4,226,201 | 10/1980 | Takahashi et al. | 413/71 |

FOREIGN PATENT DOCUMENTS

| | | | |
|---|---|---|---|
| 1168668 | 5/1987 | Italy. | |
| 697925 | 9/1953 | United Kingdom | 198/468.11 |

OTHER PUBLICATIONS

Sales brochure—"High-Performance Fully Automatic Welding Machines for Sheet-Metal Containers", Soudronic AG, 1978.

Primary Examiner—Jack Lavinder
Attorney, Agent, or Firm—Banner, Birch, McKie & Beckett

[57] ABSTRACT

The device comprises a flat block with a pair of rods carrying two respective teeth, reciprocated as one in the direction followed by cans conveyed from a forming station to the welding station by a pair of chain loops driven at constant operating speed; from a fully retracted position, in which the rods engage the rolled shell of the can essentially at standstill, or in any event at minimal velocity, the block accelerates to an intermediate position at which its velocity reaches a calculated maximum and is matched substantially to that of the chains, whereupon the can is taken up by the chains and the block decelerates in the same direction toward a fully extended position before reversing.

13 Claims, 1 Drawing Sheet

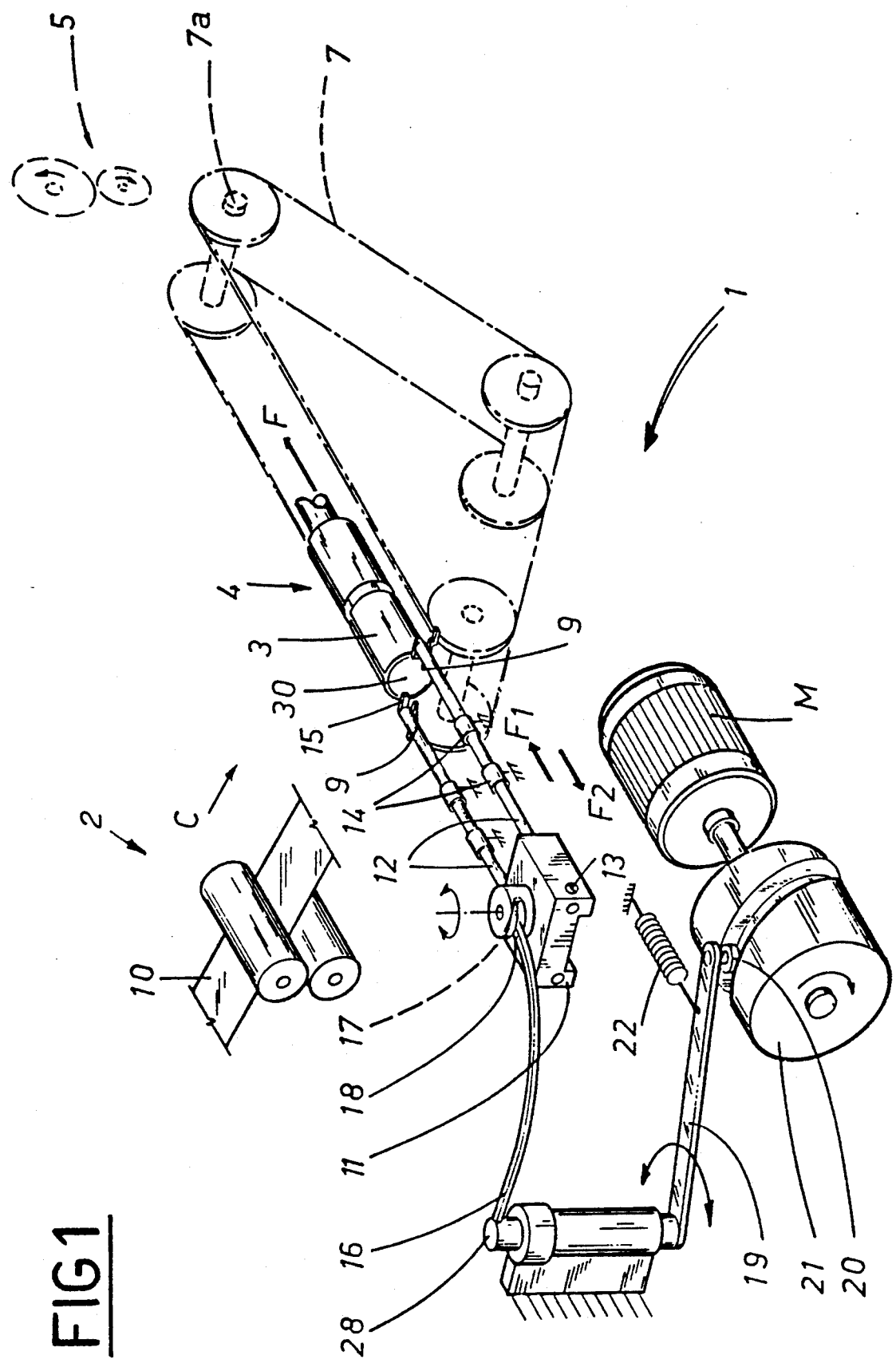

MECHANICAL ACCELERATION DEVICE IN CAN WELDING MACHINES

This application is a continuation of application Ser. No. 07/547,037 filed Jul. 2, 1990, now abandoned.

BACKGROUND OF THE INVENTION

The present invention relates to a mechanical acceleration device as used in machines for welding hollow items of cylindrical or similar shape. In conventional welding machines of the type in question, discrete strips of metal emerging from a transfer station are rolled into a cylindrical shell with the two edges for welding offered one to the other. The feed direction of the strips runs perpendicular to the transfer station runout, and accordingly, a system must be provided that will engage the strip, already invested with cylindrical shape around a guide rail but as yet motionless in the direction of its longitudinal axis, and carry it toward the station where the overlapping edges are ultimately welded together, at which point its velocity will be dictated by the operating speed of the welding components.

In short, the hollow cylindrical elements must be accelerated along the longitudinal feed direction they are required to follow.

To this end, conventional type welding machines currently utilize a conveyor consisting in a pair of chain loops occupying vertical planes, which are set apart at a distance such as allows passage of the cylindrical element and afford a plurality of pins or teeth positioned in matching pairs, which engage the rear circumferential edge of each shell and push it toward the successive work stations. In order to protect the can shells from too sharp an acceleration, and ultimately from any impact likely to cause a permanent deformation of the circumferential edge that would give a substandard end product in terms of quality, such chains are invested with non-harmonic movement at a variable velocity of $V_o \pm dV$, starting at the lower velocity of $Vo-dV$ and carried forward, accelerating to a velocity $Vo+dV$ commensurate with the rate of production required at the welding station.

Such an effect is achieved using a cam type linkage of particularly complex mechanical design, as disclosed in application no. 3400 A/89 for Italian patent filed by the same applicant.

The system in question betrays a further limitation however, given its inability to reach still higher operating speeds as increasingly demanded by the users of such welding machines, without occasioning damage to the can shells as a result of impact on the circumferential edges, which inevitably occurs during the pushing action of the chain teeth unless the machine is faultlessly adjusted.

Accordingly, the object of the present invention is to overcome the drawbacks mentioned above.

SUMMARY OF THE INVENTION

The stated object is realized through the adoption of an accelerator device according to the present invention, which consists in a cam driven mechanism insertable between the transfer and forming station and the chains by which the can shell is conveyed forward for welding, and reciprocated parallel with the path of the chains; such a device is capable of picking up the stationary shell element in correct fashion and accelerating it without damage to the velocity required farther along the line.

Among the advantages afforded by the mechanical device disclosed is the fact that, by investing the shell with an acceleration in no way damaging to its circumferential edge, the downline conveyor can be driven at constant speed, and the requirement for complex and costly transmission linkages thus eliminated.

BRIEF DESCRIPTION OF THE DRAWINGS

The invention will now be described in detail, by way of example, with the aid of the accompanying FIG. 1, which illustrates the essential construction features of the mechanical device schematically and in perspective.

DESCRIPTION OF THE PREFERRED EMBODIMENTS

The device according to the invention, denoted 1 in its entirety, is positioned between a transfer and forming station 2, from which discrete strips 10 of metal emerge in the direction denoted C rolled into cylindrical can shell elements 3, and a feed unit 4 by which the shell element 3 thus formed is carried toward a station 5 further down the line where the two overlapping edges of the element 3 are welded together.

The components mentioned thus far would be found in a typical conventional welding machine of which the feed unit 4 consists in conveyor means 7 designed to invest the shell element 3 with motion along its own longitudinal axis, in the direction denoted F. Such means comprise two chain loops 7 occupying respective vertical planes and set apart one from the other at a distance sufficient for the shell element 3 to pass between them.

The two chains 7 exhibit respective pluralities of matched teeth 9 spaced apart at regular intervals around the length of the loop, by which the single shell elements 3 are engaged from the rear and carried forward. According to the invention, the chains of the feed unit 4 are driven at constant velocity V by a shaft 7a connected mechanically to the main drive system of the welding machine.

The accelerator device 1 is positioned immediately preceding the chain loops 7 in relation to the feed direction F and comprises pushing means embodied as a flat block 11 capable of movement parallel to the feed direction F, from which a pair of cantilevered cylindrical rods 12 extend forward toward the chain loops 7. The rods 12 are seated in corresponding longitudinal sockets afforded by the block 11 and secured in position by clamp screws 13.

The rods 12 are carried slidably in supports 14 associated rigidly with the frame of the machine, which are illustrated schematically as bushings in the example of the drawing, and serve thus to guide the movement of the block 11. Tooth 15 is associated with the projecting end of each rod 12 and disposed in such a way as to create a pair of matched teeth identical to the teeth 9 of the chain loops 7. The teeth 15 of the rods 12, however, occupy and move in a horizontal plane above that of the chain loop teeth 9 in such a way as to function as alternative pushing means. The block 11 is reciprocated in the directions denoted F1 and F2 by an overhead arm 16 provided with a projection 17 movably accommodated within a slot 18 afforded by a turret extending upward from the block 11. The remaining end of the arm 16 is keyed to a freely rotatable vertical shaft 28 supported by the frame of the machine. A second arm 19 is keyed at one end to the bottom part of this same vertical shaft 28 and functions as a rocker. More exactly, the second arm 19 carries a roller 20 accommodated slidably in the profile channel of a cylindrical cam 21 disposed with its axis parallel to the feed direction F and driven by a relative motor M at a constant speed of rotation synchronously with the movement of the chains 7 and the remainder of the machine. The engagement of the roller 20 with the cam 21 is rendered stable by a spring 22 attached to the second arm 19.

The mechanical linkage thus described is designed such that when the block 11 is at its retracted dead center, the teeth 15 of the rods 12 will be at zero velocity and positioned preceding the exit of the transfer and forming station 2, to the rear of a guide element denoted 30. Thereafter, rotation of the cam 21 causes the block 11 to move forward (F1) and invest the cylindrical element 3 such that its velocity is increased gradually, accelerating from zero to a velocity V substantially matching that of the chain loop teeth 9. It is approximately at this moment that acceleration ceases and the cylindrical element 3 is transferred from the rod teeth 15 to the chain teeth 9, which then completes the transfer operation. From this point onwards, the block 11 will decelerate down to zero velocity and reverse, returning in the opposition direction (F2) to its former position in readiness for the next shell element 3.

The arrangement thus described enables a ready calculation of the rate of acceleration with which to invest the shell element 3, and the respective velocities at which engagement and release occur, whilst the chains 7 can be driven at a constant operating speed.

The foregoing specification provides one example only of the device's embodiment. Alternatively, the block 11 might be reciprocated by a mechanism that utilizes a roller tappet paired slidably with a cam profiled to produce the same intermediate and limit positions.

What is claimed is:

1. A high speed can welding machine comprising a can forming station for forming discrete strips of sheet material into cylindrical shell elements, a welding station where adjacent overlapping edges of each of said cylindrical shell elements are welded together to make a cylindrical can wall, a conveyor including at least one chain loop extending between said can forming station and said welding station, and drive means for driving said conveyor, said chain loop having a plurality of teeth, each tooth being designed to engage said cylindrical shell elements at a rear edge and convey said cylindrical shell elements from said can forming station to said welding station, wherein the improvement comprises:
   said can forming station forms said discrete strips of sheet material into cylindrical shell elements without attaching said adjacent edges together;
   said drive means continuously moves said chain loop at a high and substantially constant speed; and
   accelerator means accelerates said cylindrical shell elements, with unattached adjacent edges, from a position associated with said forming station on to said continuously moving conveyor, said accelerator means comprising a reciprocating pusher having a single continuous forward stroke for engaging and pushing one of said cylindrical shell elements along a longitudinal axis from said position associated with said forming station on to said continuously moving conveyor and a rearward stroke for retracting said pusher rearwardly so that another of said cylindrical shell elements can be pushed on to said continuously moving conveyor upon the next continuous forward stroke.

2. A device as in claim 1, wherein the velocity of the pushing means at the fully retracted limit position is zero.

3. A high speed welding machine as recited in claim 1 wherein said pusher includes a pair of reciprocating rods having at least one tooth on each rod for engaging said cylindrical shell element rear edge and pushing said cylindrical shell element on to said continuously moving conveyor.

4. A high speed welding machine as recited in claim 3 wherein said accelerator means further comprises a reciprocating block interconnecting said rods so that they move in unison.

5. A high speed welding machine as recited in claim 4 wherein said accelerator means further comprises a continuously driven motor, a cam driven by said motor, and cam follower means interconnecting said cam and said block, whereby rotary motion of said cam is converted to reciprocating motion of said block.

6. A high speed welding machine as recited in claim 1 wherein the can forming station feeds cylindrical shell elements to said accelerator means in a direction perpendicular to said axis.

7. A high speed can welding machine comprising a can forming station for forming discrete strips of sheet material into cylindrical shell elements having adjacent edges which are free and unattached, a welding station where adjacent edges of each of said cylindrical shell elements are welded together to make a cylindrical can wall, a conveyor including at least one chain loop extending between said can forming station and said welding station, and drive means for driving said conveyor, said chain loop having a plurality of teeth, each tooth being designed to engage said cylindrical shell elements at a rear edge and convey said cylindrical shell elements from a transfer position to said welding station, wherein the improvement comprises:
   said can forming station forms said discrete strips of sheet material into cylindrical shell elements without attaching said adjacent edges together and locates said shell elements at a position associated with said can forming station;
   said drive means continuously moves said chain loop at a high and substantially constant speed; and
   accelerator means for accelerating said cylindrical shell elements, with unattached adjacent edges, from a substantially zero velocity at the position associated with said can forming station to a velocity substantially equal to said constant speed on to said continuously moving conveyor at said transfer position, said accelerator means comprising a reciprocating pusher being movable between a fully retracted limit position and a fully extended limit position, and passing an intermediate position therebetween, said reciprocating pusher having a single continuous forward stroke moving between said fully retracted and fully extended positions for engaging and pushing one of said cylindrical shell elements along a longitudinal axis from its fully retracted limit position at the position associated with said forming station on to said continuously moving conveyor at its intermediate position and a rearward stroke moving between said fully extended and fully retracted positions for retracting said pusher rearwardly so that another of said cylindrical shell elements can be pushed on to said continuously moving conveyor by the reciprocating pusher upon the next continuous forward stroke.

8. A high speed can welding machine as in claim 7, wherein the velocity of the reciprocating pusher at its fully retracted and extended limit positions is zero.

9. A high speed can welding machine as in claim 7, wherein the velocity of the reciprocating pusher at its intermediate position is substantially equal to said constant speed of said chain loop.

10. A high speed can welding machine as recited in claim 7 wherein the can forming station feeds the discrete strips of sheet material in a direction perpendicular to said axis.

11. A high speed can welding machine as recited in claim 7 wherein said pusher includes a pair of reciprocating rods having at least one tooth on each rod for engaging said cylindrical shell element rear edge and pushing said cylindrical shell element on to said continuously moving conveyor.

12. A high speed can welding machine as recited in claim 11 wherein said accelerator means further comprises a reciprocating block interconnecting said rods so that they move in unison.

13. A high speed can welding machine as recited in claim 12 wherein said accelerator means further comprises a continuously driven motor, a cam driven by said motor, and cam follower means interconnecting said cam and said block, whereby rotary motion of said cam is converted to reciprocating motion of said block.

* * * * *